(12) United States Patent
Kiesekamp et al.

(10) Patent No.: US 9,729,386 B2
(45) Date of Patent: Aug. 8, 2017

(54) SYSTEM AND METHOD OF VISUALIZING MOST UNHEALTHY NETWORK ELEMENTS WITHIN A NETWORK OR DATA CENTER

(71) Applicants: David B. Kiesekamp, Merrickville (CA); Tania Pilon, Carp (CA); Ronald Bolder, Ottawa (CA)

(72) Inventors: David B. Kiesekamp, Merrickville (CA); Tania Pilon, Carp (CA); Ronald Bolder, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 190 days.

(21) Appl. No.: 14/573,558

(22) Filed: Dec. 17, 2014

(65) Prior Publication Data

US 2016/0183109 A1 Jun. 23, 2016

(51) Int. Cl.
*H04L 12/24* (2006.01)
*H04L 12/26* (2006.01)
*H04W 24/04* (2009.01)

(52) U.S. Cl.
CPC ...... *H04L 41/0609* (2013.01); *H04L 41/0233* (2013.01); *H04L 41/065* (2013.01); *H04L 41/22* (2013.01); *H04L 41/069* (2013.01); *H04W 24/04* (2013.01)

(58) Field of Classification Search
CPC ... H04L 43/045; H04L 41/22; H04L 12/2458; H04L 67/36; H04L 41/06; H04L 41/0604; H04L 41/0609; H04L 41/0613; H04L 41/0618; H04L 41/0622; H04L 41/0627; H04L 41/0631; H04L 41/069; H04L 41/0695; H04L 41/0893; H04W 24/04; H04W 24/08
See application file for complete search history.

(56) References Cited

U.S. PATENT DOCUMENTS

| | | | | |
|---|---|---|---|---|
| 7,243,130 B2* | 7/2007 | Horvitz | ............... | G05B 19/404 709/206 |
| 7,535,824 B2* | 5/2009 | Wallenius | ............... | H04L 41/06 370/216 |
| 7,542,428 B1* | 6/2009 | Johnson | ............... | H04L 41/064 370/241 |
| 7,568,126 B2* | 7/2009 | Brethereau | ........... | H04L 41/069 714/26 |
| 8,589,543 B2* | 11/2013 | Dutta | .................. | G06F 11/3006 709/224 |
| 8,868,736 B2* | 10/2014 | Bowler | ............... | H04L 43/0823 375/229 |
| 9,413,810 B2* | 8/2016 | Rezvani | .................. | G06F 21/31 |
| 2003/0046386 A1 | 3/2003 | Takats | | |
| 2007/0268300 A1* | 11/2007 | (Janet) | .................. | G05B 15/02 345/581 |

(Continued)

*Primary Examiner* — Ahmed Elallam
(74) *Attorney, Agent, or Firm* — Tong, Rea, Bentley & Kim, LLC

(57) ABSTRACT

Systems, methods, architectures, mechanisms and/or apparatus to manage the plurality of network elements within a network by ranking some or all of the network elements according to respective measurements of network element health and performing a visualization function configured to provide image representative data including network element representative objects arranged in accordance with said network element ranking.

20 Claims, 6 Drawing Sheets

(56) References Cited

U.S. PATENT DOCUMENTS

| | | | |
|---|---|---|---|
| 2008/0181099 A1* | 7/2008 | Torab | H04L 41/5074 |
| | | | 370/216 |
| 2013/0013248 A1* | 1/2013 | Brugler | G06F 11/3082 |
| | | | 702/130 |
| 2014/0267788 A1* | 9/2014 | Bowler | H04N 17/00 |
| | | | 348/192 |
| 2014/0310605 A1* | 10/2014 | Basile | H04L 41/22 |
| | | | 715/736 |
| 2015/0033086 A1* | 1/2015 | Sasturkar | G06F 11/0709 |
| | | | 714/57 |
| 2016/0013990 A1 | 1/2016 | Kulkarni et al. | |
| 2016/0182274 A1* | 6/2016 | Kiesekamp | H04L 43/045 |
| | | | 709/224 |
| 2016/0231909 A1* | 8/2016 | Olsson | G05B 23/0272 |

* cited by examiner

SYSTEM AND METHOD OF VISUALIZING MOST UNHEALTHY NETWORK ELEMENTS WITHIN A NETWORK OR DATA CENTER

FIELD OF THE INVENTION

The invention relates to the field of network and data center management and, more particularly but not exclusively, to management of event data in networks, data centers and the like.

BACKGROUND

Existing network management systems used within the context of, illustratively, network operations centers (NOCs) provide to operators a visualization of virtual or nonvirtual elements within a deployed communication network or data center. This visualization can be graphically manipulated by the user to provide various management functions. However, while useful, existing network management systems typically require significant human knowledge of the communication network or data center topology as well as the likely sources of failure or operational degradation.

Currently, the network operator relies on filtered and sorted alarm lists, Network Maps, as well as physical alarm LEDs and indications on equipment to determine which NEs to trouble shoot first. These methods require the user to sort through tens/hundreds of thousands of alarms and still will not always indicate which NE needs the most attention. The judgment of the user is required to determine which NE is investigated first.

Specifically, presented with an undesired operational mode, a skilled operator in the NOC (or remotely accessing a management system) may understand what type of elements or sub-elements within the communication network or data center are likely the cause of the failure or undesired operational mode and, thus, can then address the failure or the undesired operational mode.

Unfortunately, few have the necessary knowledge or skills for this task. Further, the enormous amount of alarms, warnings and other information generated by the (typically) thousands of elements within a communication network or data center is difficult for even the most skilled operator to manage in a timely manner.

SUMMARY

Various deficiencies in the prior art are addressed by systems, methods, architectures, mechanisms and/or apparatus to enable a network operator or user to rapidly prioritize which Network Elements (NEs) associated with various alarm conditions should be investigated or subjected to troubleshooting procedures first.

Various embodiments contemplate managing a plurality of network elements within a network by ranking some or all of the network elements according to respective measurements of network element health and performing a network element visualization function configured to provide image representative data including network element representative objects arranged in accordance with said network element ranking.

Various elements provide a visual representation of "unhealthy" NEs such as a matrix of tiles or other NE representative display objects for identifying and prioritizing for troubleshooting the top N unhealthy NEs. In this manner, an operator or user is provided with an efficient path or sequence of NEs for troubleshooting and/or other workflow purposes.

An apparatus for managing a plurality of network elements within a network according to one embodiment comprises a processor and a memory communicatively connected to the processor, the processor configured for: retrieving, for at least a portion of the network elements to be managed, respective network element information including alarm information; performing a ranking function configured to rank the portion of the network elements to be managed according to respective measurements of network element health, the network element being determined using respective network element alarm information; and performing a network element visualization function configured to provide image representative data including a group of objects, each object being indicative of identification information and alarm related information associated with a respective network element, the group of objects being arranged within an image region in accordance with the network element ranking.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
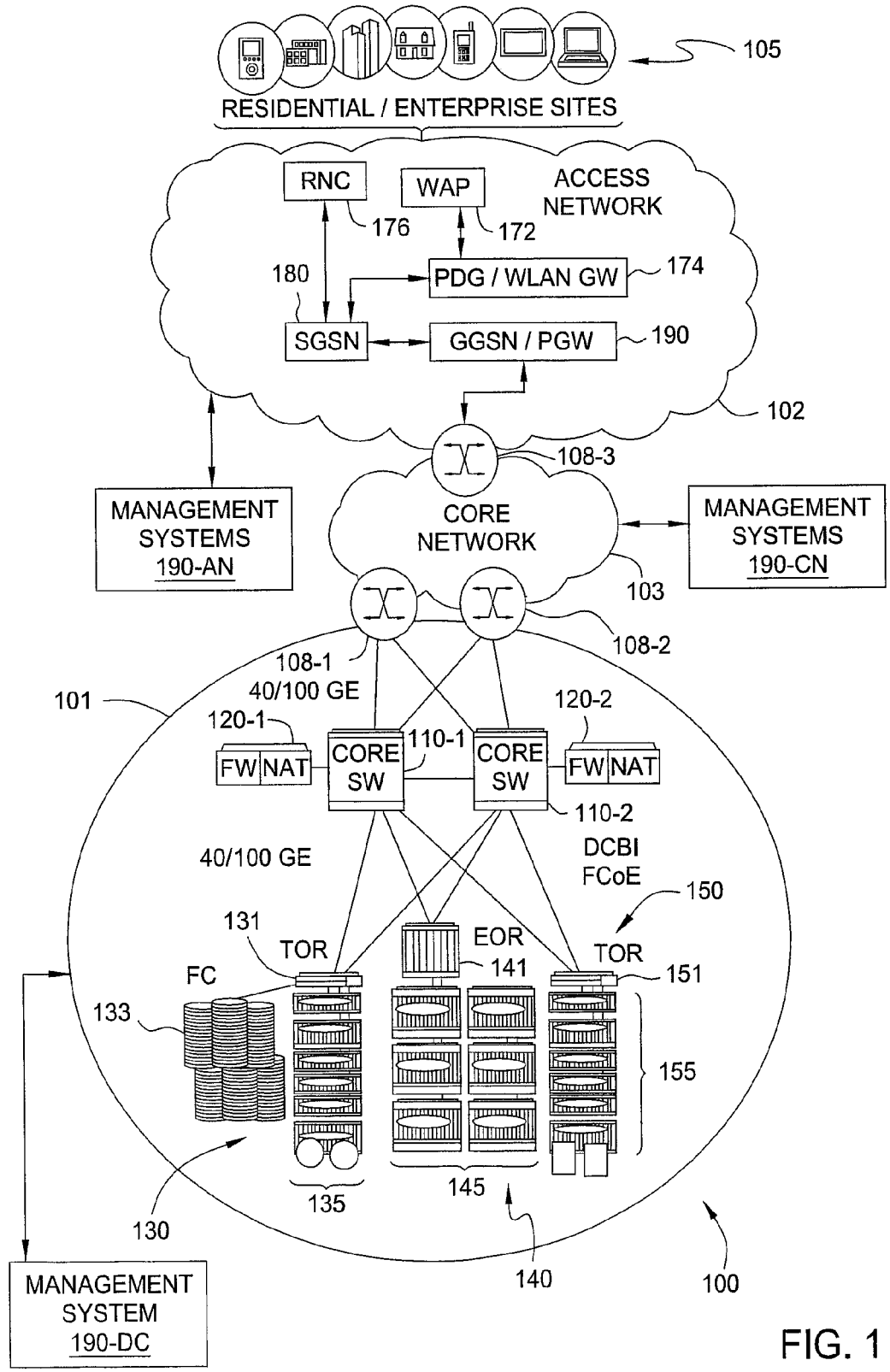
FIG. 1 depicts a high-level block diagram of a system useful in illustrating various embodiments.

The invention will be discussed within the context of systems, methods, architectures, mechanisms and/or apparatus to visualize the most "unhealthy" network elements (NEs) within a network or data center to enable a network operator or user to rapidly prioritize which NEs should be investigated or subjected to troubleshooting procedures first.

Various embodiments described herein relate to a visualization tool for generating visualization graphical user interface (GUI) imagery and/or other imagery presented to operators are users managing a network or data center. In particular, within the context of managing a network or data center the operators or users perform various troubleshooting, maintenance and other tasks in response to information pertaining to the various virtual and nonvirtual entities, network elements, communications links and so on forming a network or data center being managed.

An exemplary visualization tool may include a computer program that generates management display visualizations adapted to prioritize operator/user efforts, provide operational and performance information pertaining to virtual and nonvirtual network elements, communications links and other managed entities. The computer program may be executed within the context of a management system (MS) implemented in whole or in part at a network operations center (NOC) or other location.

Various embodiments contemplate a visual representation of "unhealthy" NEs such as a matrix of tiles or other NE representative display objects for identifying and prioritizing for troubleshooting the top N unhealthy NEs. In this manner, an operator or user is provided with an efficient path or sequence of NEs for troubleshooting and/or other workflow purposes. The health of a particular NE may be defined in accordance with alarm related information, failure impact related information and the like. It will be appreciated by those skilled in the art that the invention has broader applicability than described herein with respect to the various embodiments.

Various embodiments present the operator or user with an ordered visualization of the top N (e.g., 50) NEs which have the most problems; that is, the top N most unhealthy NEs. In this manner, the operator or user is provided with an easily understandable visual tool for efficiently guiding the troubleshooting or workflow efforts of the operator or user. In particular, the most unhealthy NEs are clearly identified such that the operator or user may investigate these NEs in sequence in descending order of unhealthiness such that the largest troubleshooting result for the least amount of troubleshooting time may be achieved. Further, the various unhealthiness visualizations provide a quick reference enabling operators and users to quickly verify particular problems within a group of NEs, such as in a communications network or data center.

Various embodiments present the operator or user with imagery such as a matrix comprising N (e.g., 50) individual tile shaped objects, each object representing a respective NE. The tiles may be arranged or ordered in an image region based on the number or total severity of alarms of the respective NEs. The tiles may be arranged or ordered in an image region based on the impact to other NEs of the failure of their respective NEs (e.g., the total number of other alarms impacted by or related to the alarm or failure of a particular NE). The tiles may be arranged or ordered in an image region based on by alarm importance (e.g., a ranking of contained alarms based on a user's or organization's understanding of their relative importance). These and other factors may be used individually or in any combination within the context of arranging tiles or other on-screen objects as part of the visualization embodiments discussed herein.

Various embodiments forced each NE to self identify as having a problem, thereby removing operator or user judgment is a factor in indicating which NE has a problem and, important, the relative importance of these various problems. In this manner, a operator or user may avoid time consuming and error prone methods of filtering and sorting an alarm list that could contain hundreds of thousands of individual alarms for elements within a network or data center.

Generally speaking, various embodiments provide an operator or user with a starting point for troubleshooting problems in a network or data center by visualizing alarm information in a useful manner.

In various embodiments, the network element alarm information further includes state information associated with a network element, such as operational state, administrative state, Object Life Cycle (OLC) state and so on (e.g., operational state, maintenance state, degraded performance state). Thus, in various embodiments, the functions of network element ranking, visualization and so on may be determined using network element state information, alarm information, impact information and so on alone or in any combination.

FIG. 1 depicts a high-level block diagram of a system useful in illustrating various embodiments. Specifically, FIG. 1 depicts a system 100 comprising multiple groups of managed network elements NEs, illustratively an access network 102, a core network 103 and a data center 101. More or fewer groups of managed network elements may be used within the context of various embodiments. In particular, the system 100 of FIG. 1 is really intended to illustrate that any group of managed network elements may benefit from the teachings of the various embodiments.

Referring to FIG. 1, the access network 102 supports communications between residential and/or enterprise sites 105 and the core network 103. The core network 103 supports communications between the access network 102 and the data center 101. The data center 101 communicates with the core network 103 via, illustratively, first and second provider edge (PE) routers 108-1 and 108-2. Similarly, the access network 102 communicates with the core network 103 via, illustratively, third PE router 108-3.

User equipment (UE) of the residential/enterprise sites 105 may comprise a smart phone, tablet computer, laptop computer, set top box (STB) or any other wireless wireline device capable of receiving packets or traffic flows such as associated with Service Data Flows (SDFs), Application Flows (AFs), mobile services, voice communications, electronic mail, messages and/or types of data.

Different types of UE may be utilized depending upon the characteristics of the access network 102 (e.g., wireless access network, wireline access network etc.). For example, the different types of UE, such as UE capable of accessing a mobile network directly via a Radio Network Controller (RNC) and/or via a wireless access point (WAP). The mobile network may comprise a 3G/4G mobile network such as a 3GPP network, Universal Mobile Telecommunications System (UMTS) network, long-term evolution (LTE) network and so on. The WAP may be associated with a Wi-Fi, WiMAX or other wireless access network. It will be noted that large numbers of UE may also be used.

The access network 102 and core network 103 may comprise any of a plurality of available access network and/or core network topologies and protocols, alone or in any combination, such as Virtual Private Networks (VPNs), Long Term Evolution (LTE), Border Network Gateway (BNG), Internet networks and the like. For illustrative purposes, the access network 102 of FIG. 1 is depicted as a wireless access network including multiple instances of various known network elements such as Wireless Access Point (WAP) 172, Packet Data Gateway (PDG)/Wireless LAN gateway (WLAN-GW) 174, Radio Network Controller (RNC) 176, Serving GPRS Support Node (SGSN) 180, Gateway GPRS Support Node (GGSN)/Packet Gateway (PGW) 190 as well as various other network elements (not shown) supporting control plane and/or data plane operations.

The data center 101 is depicted as comprising a plurality of core switches 110, a plurality of service appliances 120, a first resource cluster 130, a second resource cluster 140, and a third resource cluster 150. The DC 101 is generally organized in cells, where each cell can support thousands of servers and virtual machines.

Each of, illustratively, two PE nodes 108-1 and 108-2 is connected to each of the, illustratively, two core switches 110-1 and 110-2. More or fewer PE nodes 108 and/or core switches 110 may be used; redundant or backup capability is typically desired. The PE routers 108 interconnect the DC 101 with the networks 102 and, thereby, other DCs 101 and end-users 105. The DC 101 is generally organized in cells, where each cell can support thousands of servers and virtual machines.

Each of the core switches 110-1 and 110-2 is associated with a respective (optional) service appliance 120-1 and 120-2. The service appliances 120 are used to provide higher layer networking functions such as providing firewalls, performing load balancing tasks and so on.

The resource clusters 130-150 are depicted as compute and/or storage resources organized as racks of servers implemented either by multi-server blade chassis or individual servers. Each rack holds a number of servers (depending on the architecture), and each server can support a number of processors. A set of network connections connect the servers with either a Top-of-Rack (ToR) or End-of-Rack (EoR) switch. While only three resource clusters 130-150 are shown herein, hundreds or thousands of resource clusters may be used. Moreover, the configuration of the depicted resource clusters is for illustrative purposes only; many more and varied resource cluster configurations are known to those skilled in the art. In addition, specific (i.e., non-clustered) resources may also be used to provide compute and/or storage resources within the context of DC 101.

Exemplary resource cluster 130 is depicted as including a ToR switch 131 in communication with a mass storage device(s) or storage area network (SAN) 133, as well as a plurality of server blades 135 adapted to support, illustratively, virtual machines (VMs). Exemplary resource cluster 140 is depicted as including an EoR switch 141 in communication with a plurality of discrete servers 145. Exemplary resource cluster 150 is depicted as including a ToR switch 151 in communication with a plurality of virtual switches 155 adapted to support, illustratively, the VM-based appliances.

In various embodiments, the ToR/EoR switches are connected directly to the PE routers 108. In various embodiments, the core or aggregation switches 120 are used to connect the ToR/EoR switches to the PE routers 108. In various embodiments, the core or aggregation switches 120 are used to interconnect the ToR/EoR switches. In various embodiments, direct connections may be made between some or all of the ToR/EoR switches.

A VirtualSwitch Control Module (VCM) running in the ToR switch gathers connectivity, routing, reachability and other control plane information from other routers and network elements inside and outside the DC. The VCM may run also on a VM located in a regular server. The VCM then programs each of the virtual switches with the specific routing information relevant to the virtual machines (VMs) associated with that virtual switch. This programming may be performed by updating L2 and/or L3 forwarding tables or other data structures within the virtual switches. In this manner, traffic received at a virtual switch is propagated from a virtual switch toward an appropriate next hop over a tunnel between the source hypervisor and destination hypervisor using an IP tunnel. The ToR switch performs just tunnel forwarding without being aware of the service addressing.

Generally speaking, the "end-users/customer edge equivalents" for the internal DC network comprise either VM or server blade hosts, service appliances and/or storage areas. Similarly, the data center gateway devices (e.g., PE servers 108) offer connectivity to the outside world; namely, Internet, VPNs (IP VPNs/VPLS/VPWS), other DC locations, Enterprise private network or (residential) subscriber deployments (BNG, Wireless (LTE etc), Cable) and so on.

The access network 102 is associated with a management system (MS) 190-AN, the core network 103 is associated with a management system 190-CN and the data center 101 is associated with a management system 190-DC. Each of the management systems 190 is adapted to support various management functions associated with its respective network or data center; more particularly, to communicate with the respective group of network elements (NEs) within that network or data center. Each MS 190 may also be adapted to communicate with other operations support systems (e.g., Element Management Systems (EMSs), Topology Management Systems (TMSs), and the like, as well as various combinations thereof).

Each MS 190 may be implemented at a network node, network operations center (NOC) or any other location capable of communication with the relevant portion of the system 100, such the data center 101, access network 102 or core network 103. Each MS 190 may be implemented as a general purpose computing device or specific purpose computing device, such as described below with respect to FIG. 6.

Figure 2:
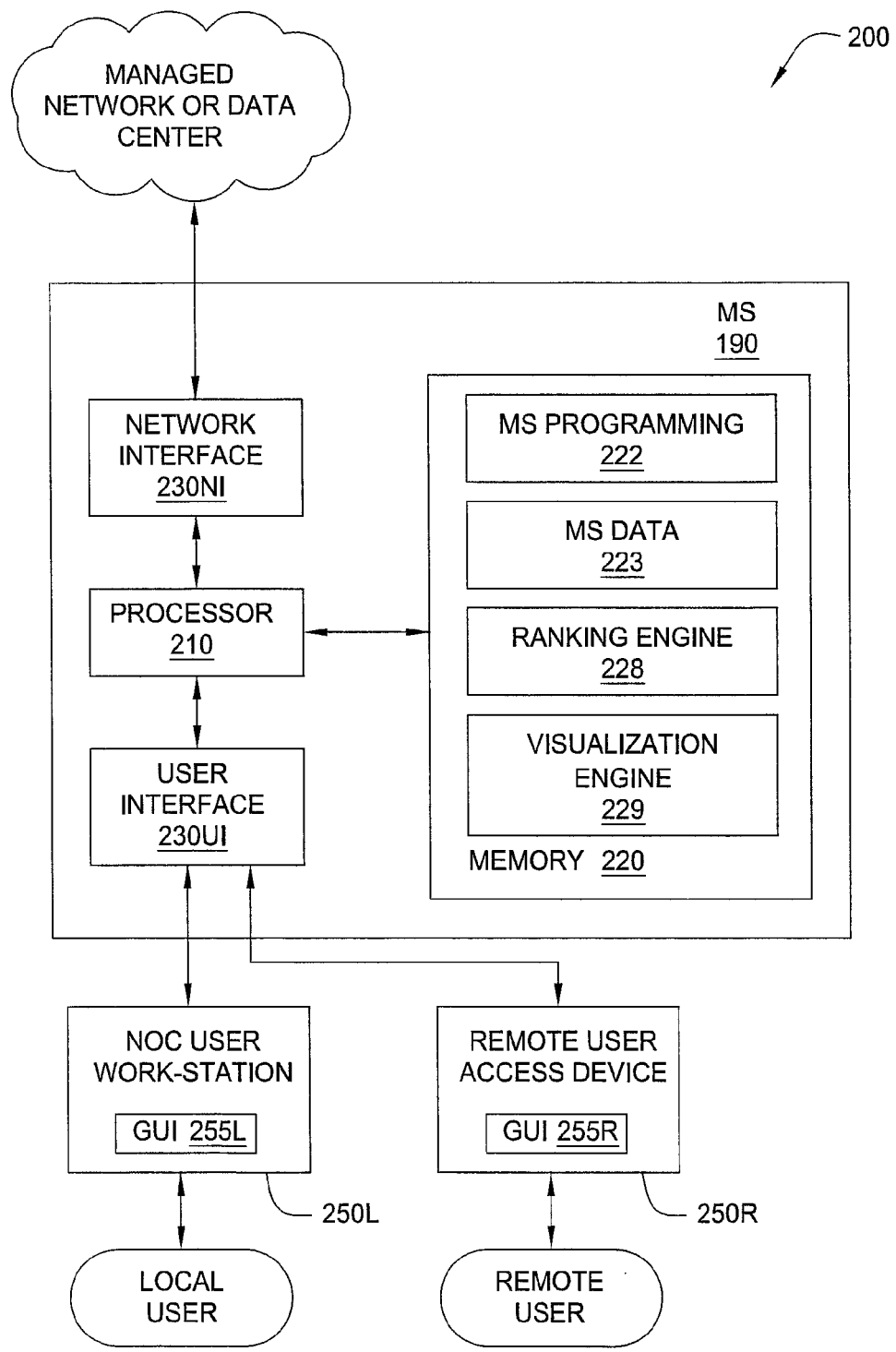
FIG. 2 depicts an exemplary management system suitable for use in the system of FIG. 1.

FIG. 2 depicts an exemplary management system suitable for use as the management system of FIG. 1. As depicted in FIG. 2, MS 190 includes one or more processor(s) 210, a memory 220, a network interface 230NI, and a user interface 230UI. The processor(s) 210 is coupled to each of the memory 220, the network interface 230NI, and the user interface 230UI.

The processor(s) 210 is adapted to cooperate with the memory 220, the network interface 230NI, the user interface 230UI and various support circuits (not shown) to provide various management functions for a group of network elements being managed, such as a group of network elements within the data center 101, access network 102 or core network 103 discussed above with respect to the system 100 of FIG. 1.

The memory 220, generally speaking, stores programs, data, tools and the like that are adapted for use in providing various management functions for a group of network elements being managed, such as a group of network elements within the data center 101, access network 102 or core network 103 discussed above with respect to the system 100 of FIG. 1.

The memory 220 includes various management system (MS) programming modules 222 and MS databases 223 adapted to implement network management functionality such as discovering and maintaining network topology, processing VM related requests (e.g., instantiating, destroying, migrating and so on) and the like as appropriate to the group of network elements being managed.

The memory 220 includes a ranking engine 228 operative to rank the various network elements within the group of network elements being managed according to a measure of network element health.

For example, a network element associated with more alarm conditions may be deemed to be less healthy than a network element associated with fewer alarm conditions. Various other measures of network element health may also be employed as will be discussed below with respect to FIG. 3. In particular, various embodiments are directed to focusing operator or user attention upon the top N most unhealthy network elements. Ranking engine 228 is configured to process alarm information and/or impact information associated with the group of managed network elements to determine thereby a ranking or ordering of the N most unhealthy network elements.

The memory 220 also includes a visualization engine 229 operable to process unhealthy network element ranking information as well as other information to define imagery suitable for use within the context of graphical user interface (GUI) accessed by a network or data center operator or user, such as within the context of a network element visualization function in which graphic elements or objects corresponding to network elements are generated for use within the context of a graphical user interface or other imagery presented to an operator or user.

For example, various objects intended for display may be defined for at least the top N most unhealthy network elements, wherein the objects include NE identification information, alarm information, root cause failure information, impact of failure information and other information. Further, the graphic/image properties associated with the objects may be adapted in response to the identification information, alarm information, root cause failure information, impact of failure information and/or other information.

In various embodiments, the MS programming module 222, ranking engine 228 and visualization engine 229 are implemented using software instructions which may be executed by a processor (e.g., processor(s) 210) for performing the various management functions depicted and described herein.

The network interface 230NI is adapted to facilitate communications with various network elements, nodes and other entities within the system 100, data center 101, access network 102, core network 103 or other network element group to support the management functions performed by MS 190.

The user interface 230UI is adapted to facilitate communications with one or more local user workstations 250L (e.g., local to a Network Operations Center (NOC)) or remote user access devices 250R (e.g., remote user computer or other access device) in communication with the MS 190 and enabling operators or users to perform various management functions associated with a group of network elements being managed via, illustratively, a graphical user interface (GUI) 255.

As described herein, memory 220 includes the MS programming module 222, MS databases 223, ranking engine 228 and visualization engine 229 which cooperate to provide the various functions depicted and described herein. Although primarily depicted and described herein with respect to specific functions being performed by and/or using specific ones of the engines and/or databases of memory 220, it will be appreciated that any of the management functions depicted and described herein may be performed by and/or using any one or more of the engines and/or databases of memory 220.

The MS programming 222 adapts the operation of the MS 190 to manage various network elements, DC elements and the like such as described herein with respect to the various figures, as well as various other network elements (not shown) and/or various communication links therebetween. The MS databases 223 are used to store topology data, network element data, service related data, VM related data, communication protocol related data and/or any other data related to the operation of the Management System 190. The MS program 222 may be implemented within the context of a Service Aware Manager (SAM) or other network manager.

Workstation 250L and remote user access device 250R may comprise computing devices including one or more processors, memory, input/output devices and the like suitable for enabling communication with the MS 190 via user interface 230UI, and for enabling one or more operators or users to perform various management functions associated with a group of network elements being managed via, illustratively, a graphical user interface (GUI) 255.

The GUI 255L of workstation 250L, as well as the GUI 255R of user access device 250R, may be implemented via processor and a memory communicatively connected to the processor, wherein the memory stores software instructions which configure the processor to perform various GUI functions in accordance with the embodiments described herein, such as to present GUI imagery to an operator or user, receive GUI object selection indicative data as well as other input information from an operator or user, and generally support and interaction model wherein the GUI provides a mechanism for user interaction with various elements of the MS 190.

Each virtual and nonvirtual network element generating events communicates these events to the MS 190 or other entity via respective event streams. The MS 190 processes the event streams as described herein and, additionally, maintains an event log associated with each of the individual event stream sources. In various embodiments, combined event logs are maintained. Further, various events may be categorized as critical alarms, major alarms, minor alarms, warnings and so on. Further, various events may be processed to identify specific failed network elements including root cause failed network elements (i.e., failed network elements which are the cause of failure of other network elements). Further, various events may be processed to identify the number of network elements impacted by the failure of a particular network element.

Generally speaking, workstation 250L and remote user access device 250R may be implemented in a manner similar to that described herein with respect to MS 190 (i.e., with processor(s) 210, memory 220, interfaces 230 and so on) and/or as described below with respect to the computing device 600 of FIG. 6. In various embodiments the workstation 250L comprises a dedicated workstation or terminal within a NOC. In various embodiments, the remote user access device 250R comprises a general purpose computing device including a browser, portal or other client-side software environment supporting the various MS 190 communications functions as well as the various GUI functions described herein.

Figure 3:
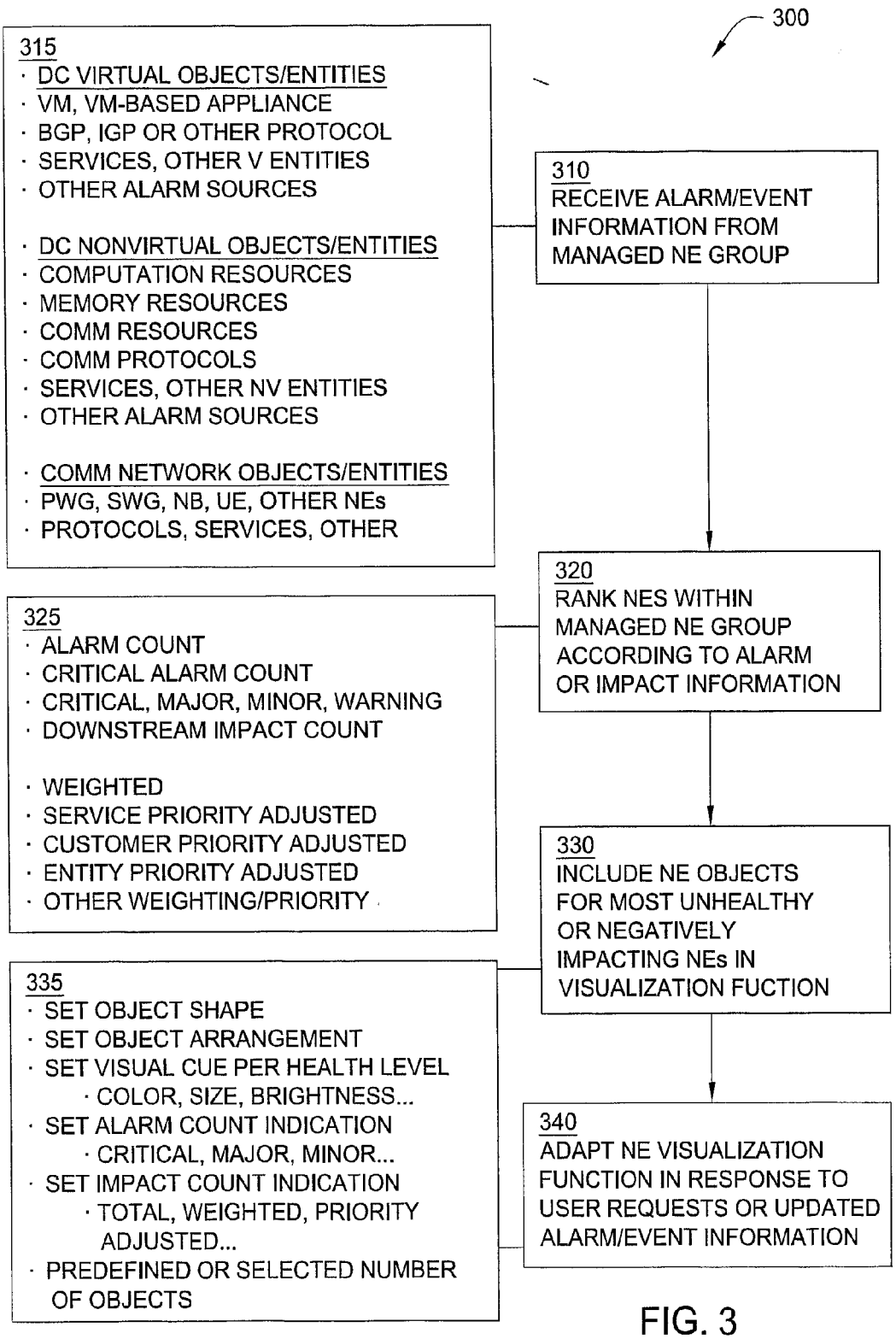
FIG. 3 depicts a flow diagram of methods according to various embodiments.

FIG. 3 depicts a flow diagram of a method according to one embodiment. Specifically, the method 300 of FIG. 3 contemplates various steps performed by, illustratively, the ranking engine 228, visualization engine 229 and/or other MS programming mechanisms 222 associated with the management system 190. In various embodiments, the ranking engine 228, visualization engine 229 and/or other MS programming mechanisms 222 are separate entities, partially combined or combined into a single functional module. In various embodiments, these functions are performed within the context of a general management function, an event/alarm processing function, an alarm generation function or other function.

At step 310, alarm/event information is received from NEs within the plurality of NEs being managed, such as from network elements, objects, entities etc. within a communications network, data center and the like. Referring to box 315, DC virtual objects/entities may comprise virtual objects/entities such as virtual machines (VMs) or VM-based appliances, Border Gateway Protocol (BGP), Interior Gateway Protocol (IGP) or other protocols, user or supervisory services, or other virtual objects/entities or network elements within a group of network elements being managed. Similarly, DC nonvirtual objects/entities may comprise computation resources, memory resources, communication resources, communication protocols, user or supervisory services/implementations and other nonvirtual objects/entities or network elements within a group of network elements being managed. Similarly, communication network objects/entities may comprise PGW, SGW, NB, UE and/or other network elements, as well as protocols, services or any other managed entity or network element within a group of network elements being managed.

At step 320, the NEs within the plurality of NEs being managed are ranked according to alarm or impact information. Referring to box 325, alarm information useful in ranking the NEs may comprise alarm count, critical alarm count, critical, major, minor or warning information and the like. Impact information may comprise downstream impact count and the like. Further, the alarm or impact information may be adapted according to various weighting or other criteria. Further, the alarm or impact information may be service priority adjusted (i.e., weighted more heavily for some services), customer priority adjusted (i.e., weighted more heavily for some customers), entity priority adjusted (i.e., weighted more heavily for some network elements or other entities), and/or some other weighting or priority adjustment mechanism. Generally speaking, step 320 provides a ranking of network elements in descending order according to network element ranking criteria. The specific network element ranking criteria may comprise default criteria or may be selected via policy information received from a network operator, via operator or user interaction with the management GUI, or via some other mechanism.

At step 330, objects for the N most unhealthy or negatively impacting network elements are included within a network element visualization function. That is, network element representative objects are generated for at least the N most unhealthy or negatively impacting network elements, the network element representative objects configured for subsequent display within the context of a screen or GUI image presented to a network or data center or user. Referring to box 335, various criteria associated with the network element representative objects may be set, including object shape (e.g., square, round, triangular and so on), object arrangement (e.g., multiple objects provided as a grid, pie chart and so on), object visual cues associated with respective network element health level (e.g., object color, object size, object brightness and so on), alarm count indication (number of all alarms, critical alarms, major alarms, minor alarms, warnings and so on), impact count indication (e.g., number of impacted network elements, weighted or priority adjusted number of impacted network elements and so on). Object display criteria may be selected via policy information received from a network operator, via operator or user interaction with the management GUI, or via some other mechanism.

Further, the number of objects to be displayed may be less than the total number of objects in the group of objects, or the total number of NEs in the group of managed NEs. The number of objects to be displayed may comprise a predefined number of objects or a selectable number of objects. For example, the number of objects may be selectable via policy information received from a network operator, via object display criteria received from the operator or user via interaction with the management GUI, or via some other mechanism.

For example, in various embodiments red objects represent the most unhealthy network elements, yellow objects represent relatively healthier network elements, and green objects represent healthy network elements. Similarly, some embodiments contemplate larger objects and/or brighter objects representing less healthy network elements. Generally speaking, visual cues are used to clearly indicate to an operator or user that particular objects are associated with network elements most in need of troubleshooting or attention (i.e., the most unhealthy network elements).

At step 340, the network element visualization function is adapted in response to user requests or updated alarm/event information. For example, the network element visualization function may be adapted in response to differing weighting criteria and the like. Similarly, the network element visualization function may be adapted in response to changes in alarm information such as a reduction in downstream network element alarms due to troubleshooting/repair of upstream network elements.

Figure 4:
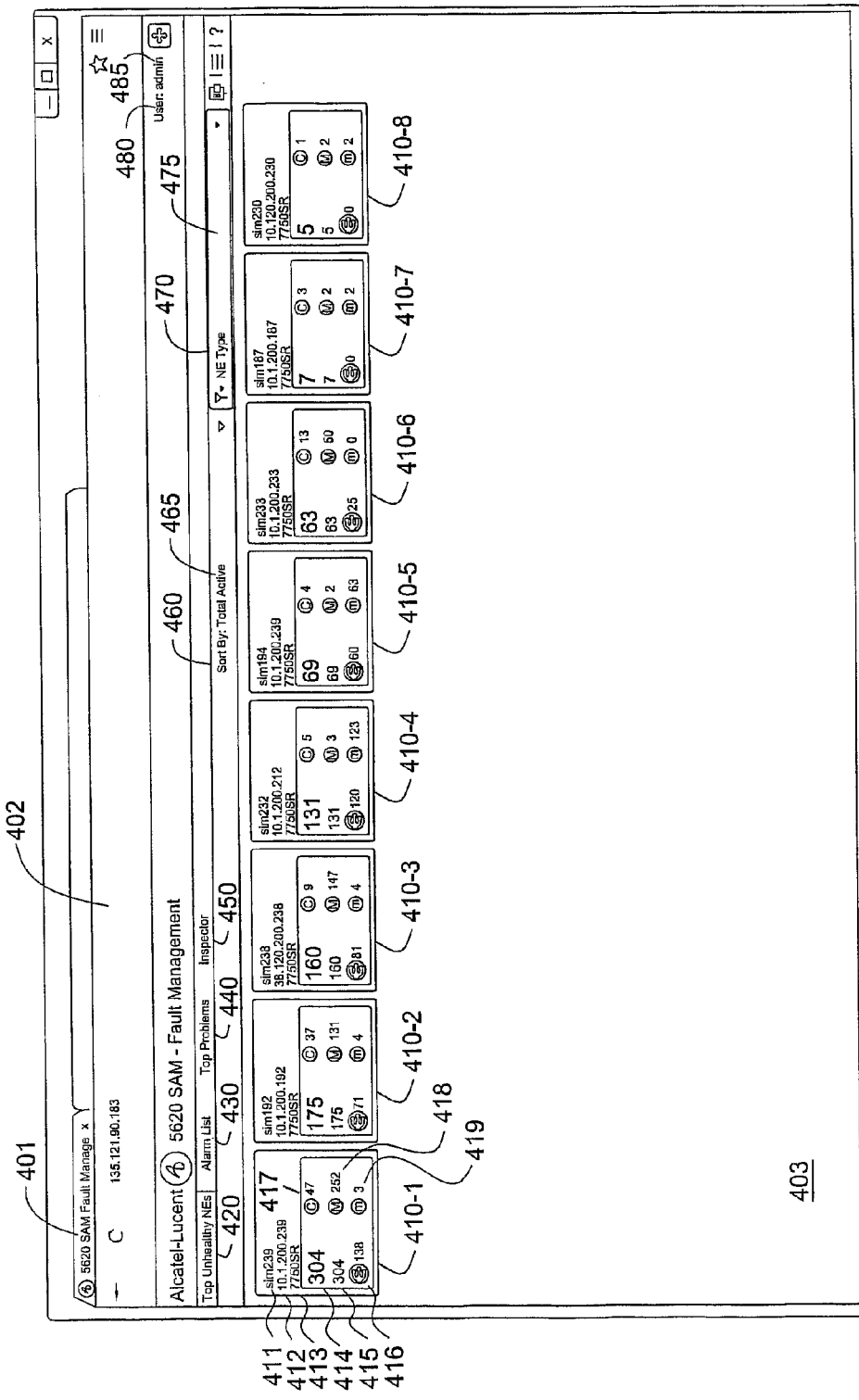
FIGS. 4-5 depict user interface display screens for presenting network element information to operators or users in accordance with various embodiments.
Figure 5:
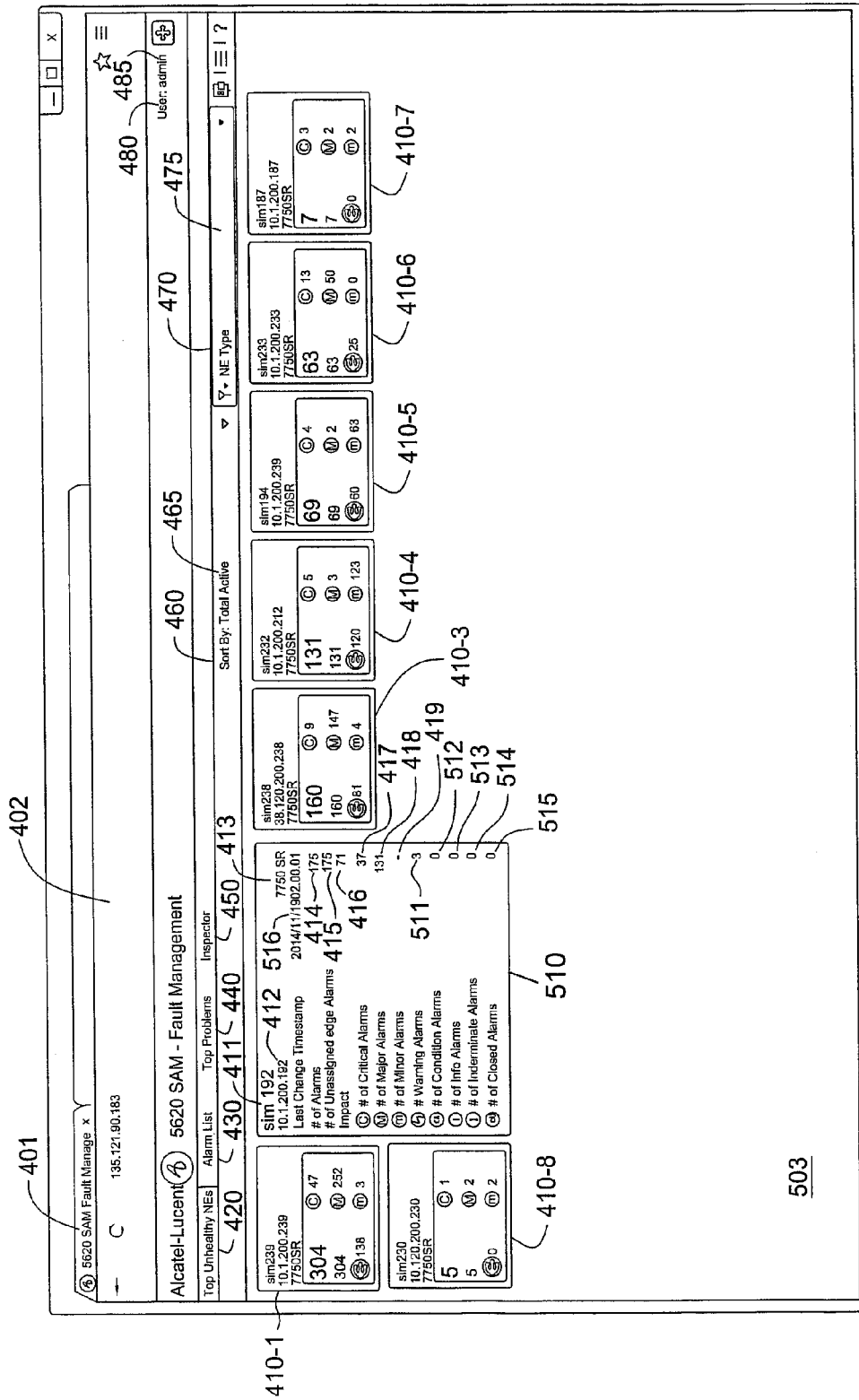

FIGS. 4-5 depict user interface display screens for presenting network element information to operators or users in accordance with various embodiments. Generally speaking, various embodiments provide an operator or user with a starting point for troubleshooting problems in a network or data center by visualizing alarm information in a useful manner via, illustratively, a graphical user interface (GUI) displaying imagery and objects in accordance with the descriptions herein.

FIG. 4 depicts a user interface display 400, illustratively within the context of a browser window or tab 401 associated with an address field 402 and image region 403. The browser window may comprise any client browser program such as Internet Explorer, Chrome, Opera, Safari, Firefox and so on. Other client-side programs suitable for this purpose are well known to those skilled in the art. Generally speaking, imagery, objects and user functionality provided or displayed within the context of the user interface display 400 is provided to an operator or user via a client computing device executing software associated with the browser program and communicating with a local (e.g., NOC) or remote server or host computing device such as indicated within address field 402.

The user interface display 400 comprises a top unhealthy NE screen and includes an image region 403 including a plurality of NE representative objects 410. While only eight objects (i.e., 410-1 through 410-8) are depicted herein, more or fewer objects 410 may be displayed. Various embodiments contemplate the display of up to N objects 410, where N is a number such as 25, 50, 100 or some other amount sufficient to show enough objects to provide meaningful information to the operator or user, yet not so large as to overwhelm the operator or user with information.

Each of the objects 410 is associated with a respective network element. Each of the objects 410 includes network element identification information, alarm information and/or other information provided via various fields.

In the depicted embodiment, network element information fields within the objects 410 comprise, illustratively, namely, a network or object name field 411, a network element address field 412 and a network element type field 413.

In the depicted embodiment, alarm information fields within the objects 410 comprise, illustratively, a first alarm count field 414, a second alarm count field 415, a critical alarm count field 417, a major alarm count field 418 and a minor alarm count field 419.

In the depicted embodiment, optional information fields within the objects 410 comprise, illustratively, an of the objects 410 includes impact information provided via a impact count field 416. In various embodiments, the impact count comprises a count of the number of network elements impacted by the alarms associated with the network element represent by the particular object 410.

The various fields described herein may comprise default fields, user configurable fields, network provider configurable fields and so on. In addition, more or fewer fields may be included within the context of the objects 410. In various embodiments, these fields are user selectable and may be configured locally or remotely by an operator or user. In various embodiments the number of fields, type of fields, content associated with field and so on may be configured or modified in whole or in part via policy updates provided by the network operator or other network management mechanisms.

The various objects 410 are arranged or sorted in descending order of health; namely, the object 410 associated with the most unhealthy network element is displayed at the upper right of the image region, while the object 410 associated with the least unhealthy network element (up to N network elements) is displayed at the right or lower right of the image region. Various embodiments contemplate different sorting orders (e.g., most healthy to least healthy), different locations of the object representing the most unhealthy network element (e.g., upper right, lower left, center and the like). Generally, speaking, the various objects may be arranged or sorted in accordance with alarm count, impact or some other criteria or combination thereof.

For example, referring to FIG. 4, the network element represented by object 410-1 has 304 alarms (47 critical, 252 major and 3 minor), which alarms have a cumulative impact upon 138 other network elements. This network element is ranked as the most unhealthy (i.e., least healthy) of the displayed network elements and, in this embodiment, is displayed at the upper left of the image region. Similarly, the network element represented by object 410-8 has 5 alarms (one critical, two major, two minor), which alarms have a cumulative impact upon no other network elements. This network element is ranked as the least unhealthy (i.e., most healthy) of the displayed network elements and, in this embodiment, is displayed at the right of the image screen.

In various embodiments, the objects 410 may be color-coded to indicate a level of health; namely, red color for very unhealthy network elements, yellow color for less unhealthy network elements, green color for healthy network elements. Thus, in various embodiments, the objects 410 may be of differing colors depending upon health, impact, alarm count or other criteria.

In various embodiments, the objects 410 may be of differing shapes depending upon health, impact, alarm count or other criteria.

In various embodiments, the objects 410 may be of differing sizes depending upon health, impact, alarm count or other criteria.

In various embodiments, the objects 410 may be of differing brightness levels depending upon health, impact, alarm count or other criteria.

The user interface display 400 may include display selection "buttons" for determining the type of information/objects displayed within the image region 403, illustratively a "Top Unhealthy NEs" selection button 420, an "Alarm List" selection button 430, a "Top Problems" selection button 440 and an "Inspector" selection button 450. Other selection buttons may also be provided depending upon desired functions. It is noted that the "Top Unhealthy NEs" selection button 420 is highlighted, indicating that the image region 403 is presently displaying the objects (i.e., objects 410-1 through 410-8) associated with the top unhealthy network elements of a group of network elements such as at a network or data center being managed.

The user interface display 400 may include a "Sort by:" selection button 460 associated with a sort criteria dropdown menu 465 (presently shown selecting a "Total Active" sort criterion). Other sort criteria may also be used.

The user interface display 400 may include a "NE Type" selection button 470 associated with a type criteria dropdown menu 475. In various embodiments, functions associated with the selection button 470 may be configured to include additional selection options such as a "topology group" selection, a "location" selection, a "power usage" selection and so on.

The user interface display 400 may include a user identification indicator 480 four identify the particular user or user access level 485, illustratively "admin."

FIG. 5 depicts a user interface screen 500 substantially similar to the user interface screen 400 described above with respect to FIG. 4, except that an image region 503 includes an expanded view 510 of an object 410-2 generated in response to an operator or user selecting or clicking on object 410-2.

Referring to FIG. 5, the expanded view 510 includes the various object fields discussed above with respect to FIG. 4 and, additionally, includes a warning count field 511, a number of condition alarms field 512, a number of information alarms field 513, a number of indeterminate alarms field 514, a number of cleared alarms field 515 and a last change timestamp field 516. More or fewer fields may be provided in response to operator or user selection of an object 410.

Figure 6:
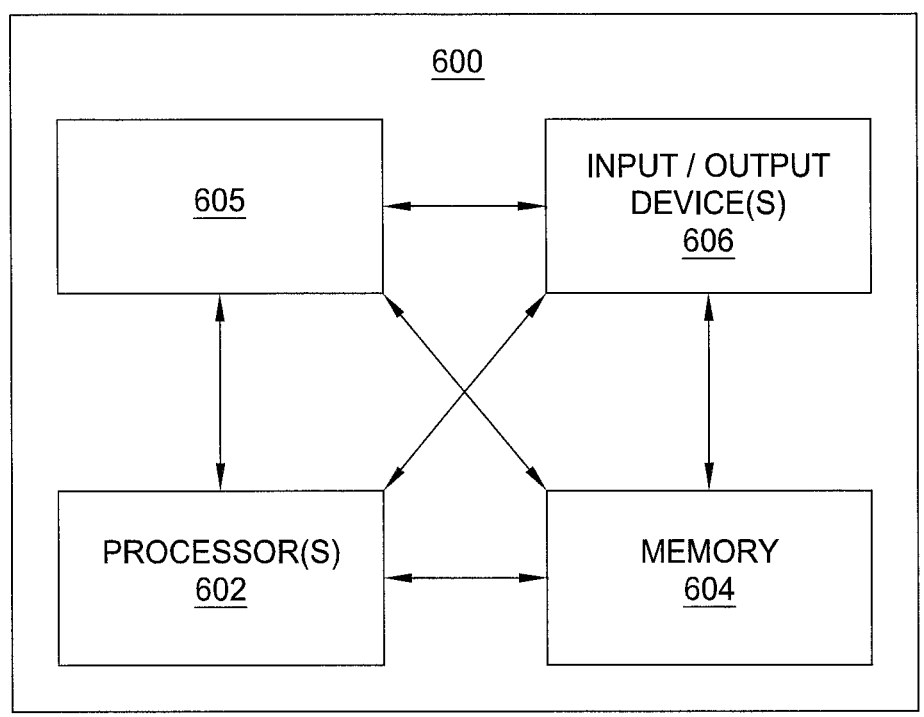
FIG. 6 depicts a high-level block diagram of a computing device suitable for use in performing the functions described herein.

FIG. 6 depicts a high-level block diagram of a computing device, such as a processor in a telecom network element, suitable for use in performing functions described herein such as those associated with the various elements described herein with respect to the figures.

As depicted in FIG. 6, computing device 600 includes a processor element 602 (e.g., a central processing unit (CPU) and/or other suitable processor(s)), a memory 604 (e.g., random access memory (RAM), read only memory (ROM), and the like), a cooperating module/process 605, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 605 can be loaded into memory 604 and executed by processor 602 to implement the functions as discussed herein. Thus, cooperating process 605 (including associated data structures) can be stored on a computer readable storage medium, e.g., RAM memory, magnetic or optical drive or diskette, and the like.

It will be appreciated that computing device 600 depicted in FIG. 6 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

The various embodiments contemplate an apparatus configured to provide ranking and visualization functions in accordance with the various embodiments, the apparatus comprising a processor and a memory communicatively connected to the processor, the processor configured to perform various ranking and visualization functions as described above with respect to the figures.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. An apparatus for managing a plurality of network elements within a network, the apparatus comprising:
a processor and a memory communicatively connected to the processor, the processor configured for:
retrieving, for at least a portion of the network elements to be managed, respective network element information including alarm information; and
performing a ranking function configured to rank said portion of the network elements to be managed according to respective measurements of network element health including network element alarm information; and
performing a visualization function configured to provide image representative data including a group of objects, each object providing identification information and at least a portion of alarm related information associated with a respective network element, wherein each object is further indicative of a number of other network elements exhibiting an alarm condition due to an alarm condition of the respective network element, said group of objects being arranged within a first image region in accordance with said network element ranking.

2. The apparatus of claim 1, wherein said network element alarm information used to determine said network element health ranking comprises an alarm count.

3. The apparatus of claim 1, wherein said network element alarm information used to determine said network element health ranking comprises a weighted alarm count.

4. The apparatus of claim 1, wherein said network element alarm information used to determine said network element health ranking comprises network element state information.

5. The apparatus of claim 4, wherein said network element state information includes at least one of a group consisting of: an operational state, an administrative state and an Object Life Cycle (OLC) state.

6. The apparatus of claim 1, wherein said group of objects comprises a number of objects less than the number of network elements within the portion of network elements to be managed.

7. The apparatus of claim 1, wherein said group of objects comprises a predefined number of objects.

8. The apparatus of claim 1, wherein said group of objects comprises a selectable number of objects, said processor being further configured for including within said group of objects a number of objects defined by received object display criteria.

9. The apparatus of claim 1, wherein each of said objects is associated with a color parameter selected in accordance with the measurement of network element health of the respective network element.

10. The apparatus of claim 1, wherein said group of objects are arranged as a plurality of tiles.

11. The apparatus of claim 1, wherein said alarm information includes a critical alarm count, a major alarm count and a minor alarm count.

12. The apparatus of claim 1, wherein said processor is further configured for determining, for each object associated network element exhibiting an alarm condition, those other network elements correspondingly exhibiting an alarm condition.

13. The apparatus of claim 12, wherein said determination of other network elements correspondingly exhibiting an alarm condition is made in accordance with a hierarchical representation of said network elements.

14. The apparatus of claim 1, wherein said processor is further configured to provide, in response to user selection of an object, a second image region including additional information for the network element associated with the selected object.

15. The apparatus of claim 1, wherein said processor is further configured to periodically perform said ranking and visualization functions using updated measurements of network element health.

16. The apparatus of claim 1, wherein said portion of the network elements to be managed comprise network elements within a communications network.

17. The apparatus of claim 1, wherein said portion of the network elements to be managed comprise non virtual elements within a data center.

18. The apparatus of claim 17, wherein said portion of the network elements to be managed comprise virtual elements within a data center.

19. A non-transitory computer-readable storage medium storing instructions which, when executed by a computer, adapt the operation of the computer to perform a method for managing a plurality of network elements within a network, the method comprising:

retrieving, for at least a portion of the network elements to be managed, respective network element information including alarm information;

performing a ranking function configured to rank said portion of the network elements to be managed according to respective measurements of network element health including network element alarm information; and performing a visualization function configured to provide image representative data including a group of objects, each object providing identification information and at least a portion of alarm related information associated with a respective network element, wherein each object is further indicative of a number of other network elements exhibiting an alarm condition due to an alarm condition of the respective network element, said group of objects being arranged within an image region in accordance with said network element ranking.

20. A computer program product wherein computer instructions, when executed by a processor in a network element, adapt the operation of the network element to provide a method for managing a plurality of network elements within a network, the method comprising:

retrieving, for at least a portion of the network elements to be managed, respective network element information including alarm information;

performing a ranking function configured to rank said portion of the network elements to be managed according to respective measurements of network element health including network element alarm information; and performing a visualization function configured to provide image representative data including a group of objects, each object providing identification information and at least a portion of alarm related information associated with a respective network element, wherein each object is further indicative of a number of other network elements exhibiting an alarm condition due to an alarm condition of the respective network element, said group of objects being arranged within an image region in accordance with said network element ranking.

* * * * *